US012602044B2

(12) United States Patent
Kida et al.

(10) Patent No.: US 12,602,044 B2
(45) Date of Patent: Apr. 14, 2026

(54) VEHICLE CONTROL SYSTEM, VEHICLE CONTROL METHOD, AND VEHICLE CONTROL PROGRAM

(71) Applicant: TOYOTA JIDOSHA KABUSHIKI KAISHA, Toyota (JP)

(72) Inventors: Yusuke Kida, Tokyo (JP); Takahiro Nakayama, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/863,992

(22) Filed: Jul. 13, 2022

(65) Prior Publication Data

US 2023/0023560 A1 Jan. 26, 2023

(30) Foreign Application Priority Data

Jul. 20, 2021 (JP) ................................. 2021-119412

(51) Int. Cl.
| | |
|---|---|
| *G05D 1/00* | (2024.01) |
| *H04N 7/18* | (2006.01) |
| *H04N 23/66* | (2023.01) |

(52) U.S. Cl.
CPC ......... *G05D 1/0038* (2013.01); *G05D 1/0246* (2013.01); *H04N 7/183* (2013.01); *H04N 23/66* (2023.01)

(58) Field of Classification Search
CPC .... G05D 1/0038; G05D 1/0246; H04N 7/183; H04N 23/66; B60R 2300/50
See application file for complete search history.

(56) References Cited

U.S. PATENT DOCUMENTS

| | | | | |
|---|---|---|---|---|
| 2014/0207535 A1* | 7/2014 | Stefan | .............. | G06Q 10/06398 |
| | | | | 701/1 |
| 2017/0217429 A1* | 8/2017 | Shioe | .................. | B60W 10/182 |
| 2019/0077509 A1* | 3/2019 | Hsu | ...................... | G05D 1/0022 |
| 2020/0257317 A1* | 8/2020 | Musk | ..................... | G06N 20/00 |
| 2020/0269833 A1* | 8/2020 | Hayakawa | ............... | G05D 1/02 |

(Continued)

FOREIGN PATENT DOCUMENTS

| | | |
|---|---|---|
| CN | 111989716 A | 11/2020 |
| JP | H11-15528 A | 1/1999 |

(Continued)

*Primary Examiner* — Kenneth J Malkowski
*Assistant Examiner* — Ibrahim Abdoalatif Alsomairy
(74) *Attorney, Agent, or Firm* — Dinsmore & Shohl LLP

(57) ABSTRACT

A vehicle control system including: a vehicle configured to be movable along a predetermined route, the vehicle including at least an image capturing apparatus; a display apparatus configured to display a video image captured by the image capturing apparatus, the display apparatus being installed in a remote place that is remote from the vehicle; a first operation terminal installed in the remote place; a control apparatus configured to control movement of the vehicle based on first operation information input through the first operation terminal; and a second operation terminal installed in a place that is closer to the vehicle than to the remote place, in which the control apparatus is configured to assist, based on second operation information input through the second operation terminal, the control of the movement of the vehicle that is based on the first operation information.

9 Claims, 6 Drawing Sheets

(56)             References Cited

U.S. PATENT DOCUMENTS

2021/0026349 A1*  1/2021  Ito ......................... G05D 1/0027
2021/0086758 A1*  3/2021  Yamanaka ............ B60W 40/08
2021/0116930 A1*  4/2021  Ariki ................. G05B 13/0265
2021/0240783 A1*  8/2021  Ricci ...................... G06Q 30/00

FOREIGN PATENT DOCUMENTS

JP          3316421  B2    8/2002
JP          3437608  B2    8/2003
WO      2019/140277  A2    7/2019

* cited by examiner

VEHICLE CONTROL SYSTEM, VEHICLE CONTROL METHOD, AND VEHICLE CONTROL PROGRAM

CROSS REFERENCE TO RELATED APPLICATIONS

This application is based upon and claims the benefit of priority from Japanese patent application No. 2021-119412, filed on Jul. 20, 2021, the disclosure of which is incorporated herein in its entirety by reference.

BACKGROUND

The present disclosure relates to a vehicle control system, a vehicle control method, and a vehicle control program.

In recent years, a system enabling a user at a remote place to have an experience which simulates actually riding in a vehicle by displaying, on a display apparatus installed in the remote place, a video image captured by an image capturing apparatus mounted on the vehicle has been developed. For example, a video image captured by an image capturing apparatus mounted on a vehicle moving along a predetermined route in a factory is displayed on a display apparatus installed in a remote place, whereby a user at the remote place is enabled to have an experience which simulates actually touring the factory while riding in the vehicle.

A related technique is disclosed, for example, in Japanese Unexamined Patent Application Publication No. H11-15528. Japanese Unexamined Patent Application Publication No. H11-15528 discloses a system including an apparatus that enables an operator to freely change the traveling speed of a mobile robot that is traveling autonomously.

SUMMARY

However, in the system disclosed in Japanese Unexamined Patent Application Publication No. H11-15528, it is necessary for the operator who is remotely operating the mobile robot to control the traveling speed of the mobile robot while simultaneously having to be concerned about whether or not there is an obstacle (a small stone, an obstacle in a blind spot, etc.) which it is difficult to visually recognize present. This causes a problem that the operator cannot smoothly control the mobile robot. As a result, for example, when the system disclosed in Japanese Unexamined Patent Application Publication No. H11-15528 is applied to a system enabling a user to have an experience which simulates actually riding in a vehicle (a mobile robot), the user may not be able to have such an experience in a comfortable manner.

The present disclosure has been made in view of the aforementioned circumstances and an object thereof is to provide a vehicle control system, a vehicle control method, and a vehicle control program that enable a user to smoothly control a vehicle.

A first exemplary aspect is a vehicle control system including: a vehicle configured to be movable along a predetermined route, the vehicle including at least an image capturing apparatus; a display apparatus configured to display a video image captured by the image capturing apparatus, the display apparatus being installed in a remote place that is remote from the vehicle; a first operation terminal installed in the remote place; a control apparatus configured to control movement of the vehicle based on first operation information input through the first operation terminal; and a second operation terminal installed in a place that is closer to the vehicle than to the remote place, in which the control apparatus is configured to assist, based on second operation information input through the second operation terminal, the control of the movement of the vehicle that is based on the first operation information. In this vehicle control system, since a supporter present near the vehicle can assist the control of the movement of the vehicle so that the vehicle can avoid an obstacle which it is difficult for a user who remotely controls the vehicle to visually recognize, the user can smoothly control the vehicle without having to be concerned about the obstacle which it is difficult for the user to visually recognize. As a result, for example, while looking at a video image captured by the image capturing apparatus mounted on the vehicle, the user is enabled to have an experience which simulates actually riding in the vehicle without having to be concerned about whether or not there is an obstacle which it is difficult to visually recognize present. Further, since it is not necessary to provide a function for avoiding an obstacle in the vehicle, an increase in cost is prevented or reduced.

When the control apparatus is instructed by the second operation information to stop the movement of the vehicle, the control apparatus may stop the movement of the vehicle regardless of a content of the first operation information.

The vehicle control system may further include a notification apparatus configured to, when the control apparatus has stopped the movement of the vehicle based on the second operation information, send a notification that the control apparatus has stopped the movement of the vehicle.

When the control apparatus is instructed by the second operation information to capture a predetermined area, the control apparatus may cause the image capturing apparatus mounted on the vehicle to capture the predetermined area.

The vehicle control system may further include a notification apparatus configured to, when the control apparatus has caused the image capturing apparatus mounted on the vehicle to capture the predetermined area based on the second operation information, send a notification that the control apparatus has caused the image capturing apparatus mounted on the vehicle to capture the predetermined area.

The control apparatus may control whether or not to move the vehicle straight forward based on the first operation information and whether or not to turn the vehicle based on the second operation information.

Another exemplary aspect is a vehicle control method including: controlling, based on first operation information input through a first operation terminal, movement of a vehicle configured to be movable along a predetermined route, the first operation terminal being installed in a remote place that is remote from the vehicle; assisting, based on second operation information input through a second operation terminal, the control of the movement of the vehicle that is based on the first operation information, the second operation terminal being installed in a place that is closer to the vehicle than to the remote place; and displaying, on a display apparatus installed in the remote place, a video image captured by an image capturing apparatus mounted on the vehicle while controlling the movement of the vehicle. In this vehicle control method, since a supporter present near the vehicle can assist the control of the movement of the vehicle so that the vehicle can avoid an obstacle which it is difficult for a user who remotely controls the vehicle to visually recognize, the user can smoothly control the vehicle without having to be concerned about the obstacle which it is difficult for the user to visually recognize. As a result, for example, while looking at a video image captured by the image capturing apparatus mounted on the vehicle, the user is enabled to have an experience which simulates actually riding in the vehicle without having to be concerned about whether or not there is an obstacle which it is difficult to visually recognize present. Further, since it is not necessary to provide a function for avoiding an obstacle in the vehicle, an increase in cost is prevented or reduced.

Another exemplary aspect is a vehicle control program for causing a computer to execute: processing of controlling, based on first operation information input through a first operation terminal, movement of a vehicle configured to be movable along a predetermined route, the first operation terminal being installed in a remote place that is remote from the vehicle; processing of assisting, based on second operation information input through a second operation terminal, the control of the movement of the vehicle that is based on the first operation information, the second operation terminal being installed in a place that is closer to the vehicle than to the remote place; and processing of displaying, on a display apparatus installed in the remote place, a video image captured by an image capturing apparatus mounted on the vehicle while controlling the movement of the vehicle. In this vehicle control program, since a supporter present near the vehicle can assist the control of the movement of the vehicle so that the vehicle can avoid an obstacle which it is difficult for a user who remotely controls the vehicle to visually recognize, the user can smoothly control the vehicle without having to be concerned about the obstacle which it is difficult for the user to visually recognize. As a result, for example, while looking at a video image captured by the image capturing apparatus mounted on the vehicle, the user is enabled to have an experience which simulates actually riding in the vehicle without having to be concerned about whether or not there is an obstacle which it is difficult to visually recognize present. Further, since it is not necessary to provide a function for avoiding an obstacle in the vehicle, an increase in cost is prevented or reduced.

According to the present disclosure, it is possible to provide a vehicle control system, a vehicle control method, and a vehicle control program that enable a user to smoothly control a vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
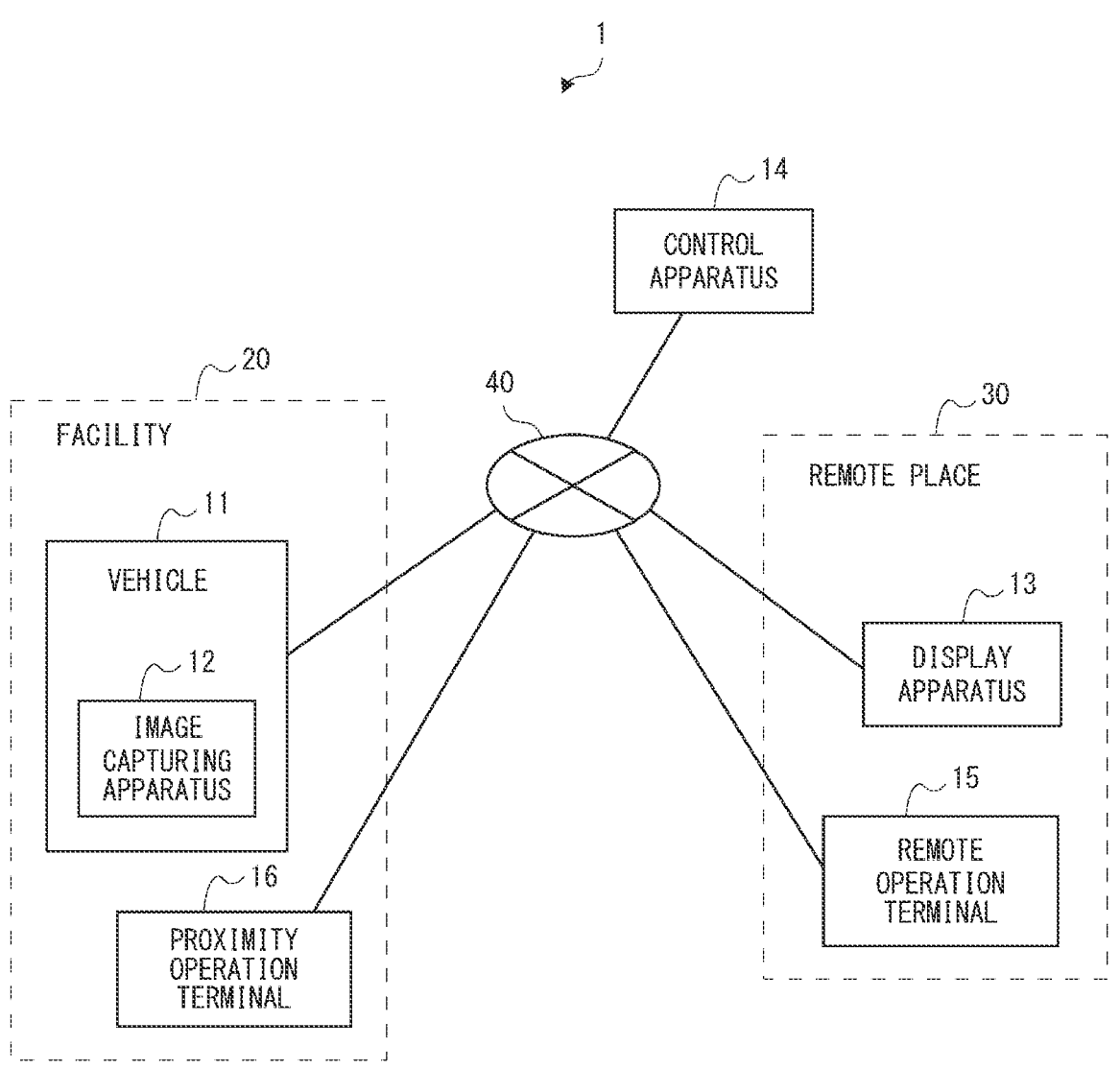
FIG. 1 is a block diagram showing a configuration example of a vehicle control system according to a first embodiment.

The present disclosure will be described hereinafter with reference to an embodiment of the present disclosure. However, the following embodiment is not intended to limit the scope of the disclosure according to the claims. Further, all the components/structures described in the embodiment are not necessarily indispensable as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

<First Embodiment>

FIG. 1 is a block diagram showing a configuration example of a vehicle control system 1 according to a first embodiment.

As shown in FIG. 1, the vehicle control system 1 includes a vehicle 11, a display apparatus 13, a control apparatus 14, a remote operation terminal (a first operation terminal) 15, a proximity operation terminal (a second operation terminal) 16, and a network 40. The vehicle 11, the display apparatus 13, the control apparatus 14, the remote operation terminal 15, and the proximity operation terminal 16 are configured to communicate with one another through the wired or the wireless network 40.

The vehicle 11 is a mobile robot configured to be movable along a predetermined route in a facility 20 such as a factory. The vehicle 11 includes at least an image capturing apparatus 12 that captures the periphery of the vehicle 11. For example, when the facility 20 is an automobile manufacturing plant, the image capturing apparatus 12 can capture the manufacturing process of an automobile by capturing the periphery of the vehicle 11 from the vehicle 11 moving in the facility 20. Alternatively, when the facility 20 is an art exhibition hall, the image capturing apparatus 12 can capture various types of exhibits by capturing of the periphery of the vehicle 11 from the vehicle 11 moving in the facility 20.

The display apparatus 13 is installed in a remote place 30 that is remote from the vehicle 11. The remote place 30 is any place remote from the facility 20, such as a factory, and is, for example, a home of a user (a user of the vehicle control system 1) or an event hall where a tour of the facility 20 is held. The display apparatus 13 is, for example, a monitor of a Personal Computer (PC) terminal, a monitor of a mobile terminal such as a tablet terminal, or a monitor dedicated to the vehicle control system 1. A video image captured by the image capturing apparatus 12 is displayed on the display apparatus 13.

The remote operation terminal 15 is installed in the remote place 30 together with the display apparatus 13. The remote operation terminal 15 is, for example, a keyboard provided in a PC terminal, an operation screen of a mobile terminal such as a tablet terminal, or an operation terminal dedicated to the vehicle control system 1. The remote operation terminal 15 receives information about an operation of the vehicle 11 from a user and transmits it to the control apparatus 14.

The proximity operation terminal 16 is installed in a place that is closer to the vehicle 11 than to the place where the remote operation terminal 15 is installed. For example, the proximity operation terminal 16 is installed in a management room of the facility 20, or in a place close to the vehicle 11 from which the vehicle 11 and its surroundings can be visually recognized. The proximity operation terminal 16 is, for example, a keyboard provided in a PC terminal, an operation screen of a mobile terminal such as a tablet terminal, or an operation terminal dedicated to the vehicle control system 1. The proximity operation terminal 16 receives information about an operation of the vehicle 11 from a supporter (an administrator of the vehicle control system 1 or a person in charge of the same) and transmits it to the control apparatus 14.

The control apparatus 14 performs overall control of the vehicle control system 1. Note that the control apparatus 14 controls movement of the vehicle 11 based on operation information (hereinafter also referred to as first operation information) input through the remote operation terminal 15.

For example, when operation information for instructing the vehicle 11 to move forward or backward along a pre-determined route is input to the remote operation terminal 15 by a user's operation, the control apparatus 14 moves the vehicle 11 forward or backward along the predetermined route in accordance with the operation information. Further, when operation information for instructing the vehicle 11 to stop its movement is input to the remote operation terminal 15 by a user's operation, the control apparatus 14 stops the movement of the vehicle 11 in accordance with the operation information.

Further, the control apparatus 14 is configured to assist, based on operation information (hereinafter also referred to as second operation information) input through the proximity operation terminal 16, the control of the movement of the vehicle 11 that is based on the first operation information (the operation information input through the remote operation terminal 15).

For example, when the vehicle 11 is moving along a predetermined route and operation information for instructing the vehicle 11 to avoid an obstacle (a small stone, an obstacle in a blind spot, etc.) that has been found on the predetermined route is input to the proximity operation terminal 16 by a supporter's operation, the control apparatus 14 moves the vehicle 11 along a detour route that allows the vehicle 11 to avoid the obstacle in accordance with the operation information.

Further, when the vehicle 11 is moving along a predetermined route and operation information for instructing the vehicle 11 to urgently stop its movement is input to the proximity operation terminal 16 by a supporter's operation, the control apparatus 14 stops the movement of the vehicle 11 regardless of the content of the first operation information.

Further, when operation information for instructing the image capturing apparatus 12 to change its capturing range (e.g., to capture a predetermined area) is input to the proximity operation terminal 16 by a user's operation, the control apparatus 14 changes the capturing range of the image capturing apparatus 12 in accordance with the operation information (e.g., causes the image capturing apparatus 12 to capture the predetermined area).

Note that the vehicle control system 1 may further include a notification apparatus that, when the image capturing apparatus 12 has been caused to capture a predetermined area or the vehicle 11 has been caused to stop urgently in accordance with the second operation information, sends a notification that the image capturing apparatus 12 has been caused to capture the predetermined area or the vehicle 11 has been caused to stop urgently. The notification apparatus is, for example, a speaker, and is installed in the remote place 30 together with the display apparatus 13 and the like.

Further, the control performed by the control apparatus 14 is not limited to the control described above, and the control apparatus 14 may control whether or not to move the vehicle 11 straight forward based on the first operation information and whether or not to turn the vehicle 11 based on the second operation information.

(Example of a Setting Operation of the Vehicle Control System 1)

Next, an example of a setting operation of the vehicle control system 1 will be described with reference to FIG. 2.

Figure 2:
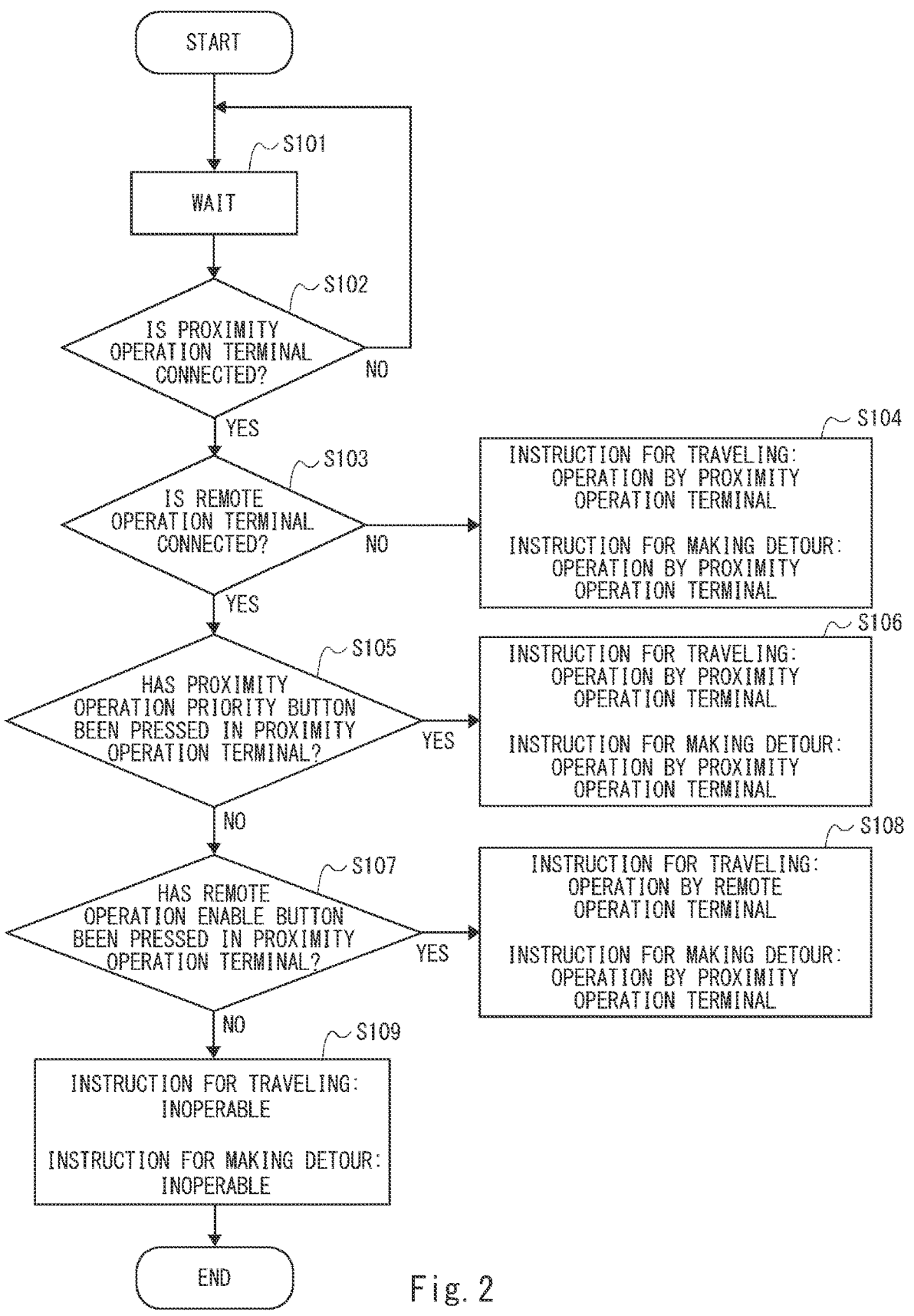
FIG. 2 is a flowchart showing an example of a setting operation of the vehicle control system shown in FIG. 1.

FIG. 2 is a flowchart showing the example of the setting operation of the vehicle control system 1.

First, the vehicle control system 1 causes the vehicle 11 to wait until the proximity operation terminal 16 is connected to the network 40 (Step S101->NO in Step S102).

When the proximity operation terminal 16 is connected to the network 40 (YES in Step S102), it is then checked whether or not the remote operation terminal 15 is connected to the network 40 (Step S103).

When the remote operation terminal 15 is not connected to the network 40 (NO in Step S103), both a normal traveling of the vehicle 11 and a detour traveling of the vehicle 11 for avoiding an obstacle are controlled in accordance with the content of the instruction indicated by the operation information input through the proximity operation terminal 16 (Step S104).

On the other hand, when the remote operation terminal 15 is connected to the network 40 (YES in Step S103), it is then checked whether or not a proximity operation priority button provided in the proximity operation terminal 16 has been pressed (Step S105).

When the proximity operation priority button has been pressed (YES in Step S105), priority is given to the operation of the proximity operation terminal 16, and therefore both a normal traveling of the vehicle 11 and a detour traveling of the vehicle 11 for avoiding an obstacle are controlled in accordance with the content of the instruction indicated by the operation information input through the proximity operation terminal 16 (Step S106).

On the other hand, when the proximity operation priority button has not been pressed (NO in Step S105), it is then checked whether or not a remote operation enable button provided in the proximity operation terminal 16 has been pressed (Step S107).

When the remote operation enable button has been pressed (YES in Step S107), the operation of the remote operation terminal 15 is enabled, and therefore a normal traveling (movement along a predetermined route) of the vehicle 11 is controlled in accordance with the content of the instruction indicated by the operation information (the first operation information) input through the remote operation terminal 15, and a detour traveling of the vehicle 11 for avoiding an obstacle is controlled in accordance with the content of the instruction indicated by the operation information (the second operation information) input through the proximity operation terminal 16 (Step S108).

On the other hand, when the remote operation enable button has not been pressed (NO in Step S107), priority is not given to the operation of the proximity operation terminal 16 and the operation of the remote operation terminal 15 becomes invalid, and therefore the operation information input to either the remote operation terminal 15 and the proximity operation terminal 16 becomes invalid (Step S109).

Note that the setting operation shown in FIG. 2 is merely an example, and for example, one or both the proximity operation priority button and the remote operation enable button may be omitted. In this embodiment, a description is given of an example of a case in which operation information input to either the remote operation terminal 15 and the proximity operation terminal 16 is valid (i.e., the setting state of Step S108 shown in FIG. 2).

(Example of an Operation Performed by the Vehicle 11 to Avoid an Obstacle)

Next, an example of an operation performed by the vehicle 11 to avoid an obstacle will be described with reference to FIGS. 3 and 4.

Figure 3:
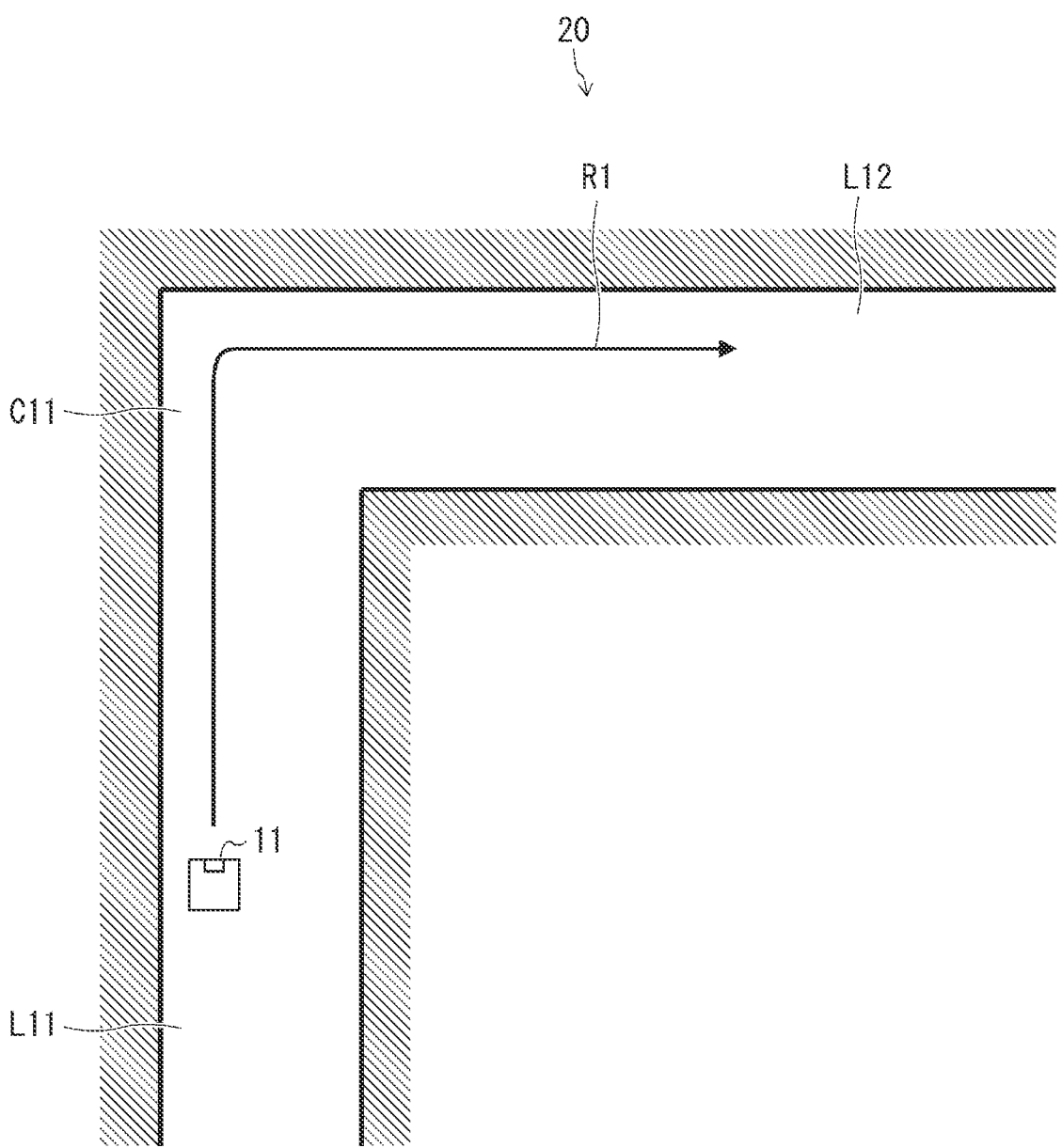
FIG. 3 is a diagram showing an example of a predetermined moving route of a vehicle provided in the vehicle control system shown in FIG. 1.

FIG. 3 is a diagram showing an example of a predetermined moving route of the vehicle 11.

Figure 4:
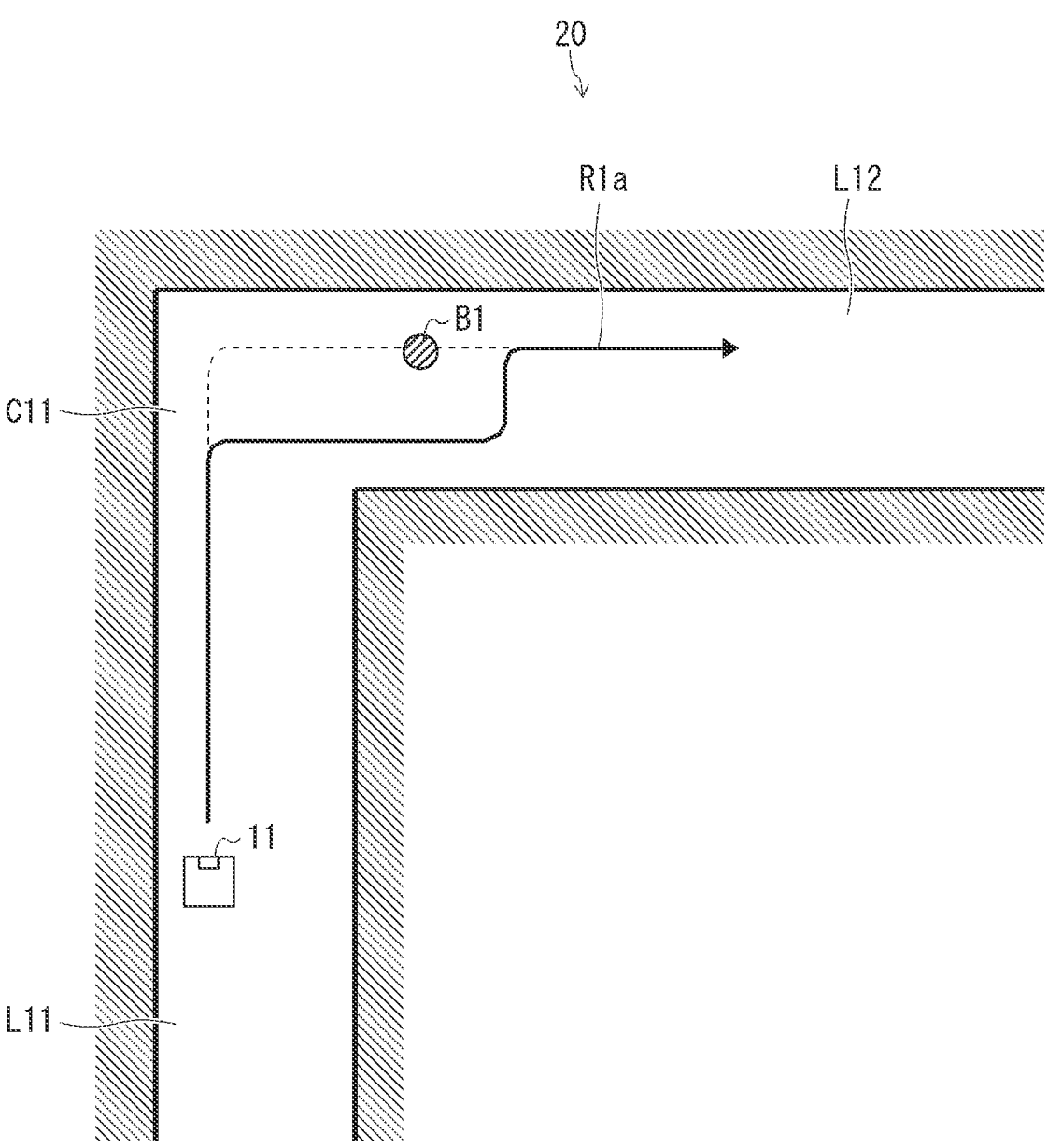
FIG. 4 is a diagram showing an example of an operation performed by the vehicle provided in the vehicle control system shown in FIG. 1 to avoid an obstacle.

FIG. 4 is a diagram showing the example of an operation performed by the vehicle 11 to avoid an obstacle.

In the example shown in FIG. 3, a passage L11, a passage L12, and a corner C11 connecting the passage L11 to the passage L12 are provided in the facility 20. In the example shown in FIG. 3, the control apparatus 14 is moving the vehicle 11 along a moving route R1 formed from the passage L11 to, via the corner C11, the passage L12 based on the first operation information input through the remote operation terminal 15.

Note that, as shown in FIG. 4, when an obstacle B1 has been found in an area on the moving route R1 that is a blind spot for the vehicle 11, a supporter present near the vehicle 11 inputs operation information for instructing the vehicle 11 to avoid the obstacle B1 to the proximity operation terminal 16. By doing the above, the control apparatus 14 moves the vehicle 11 along a detour route R1a for avoiding the obstacle B1 in accordance with the operation information.

(Another Example of an Operation Performed by the Vehicle 11 to Avoid an Obstacle)

Next, another example of an operation performed by the vehicle 11 to avoid an obstacle will be described with reference to FIGS. 5 and 6.

Figure 5:
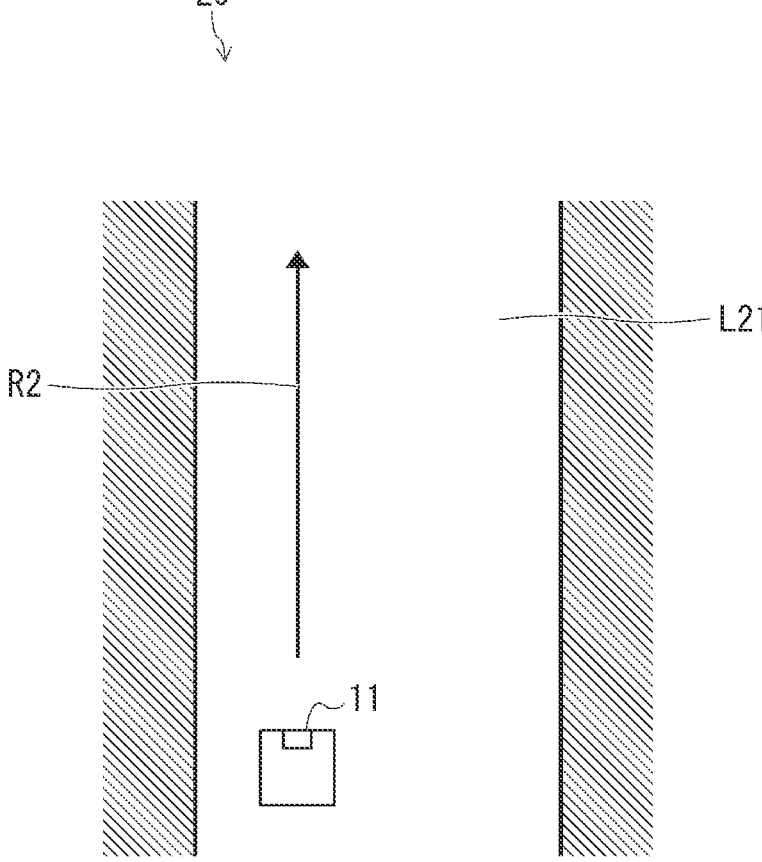
FIG. 5 is a diagram showing another example of the predetermined moving route of the vehicle provided in the vehicle control system shown in FIG. 1.

FIG. 5 is a diagram showing another example of a predetermined moving route of the vehicle 11.

Figure 6:
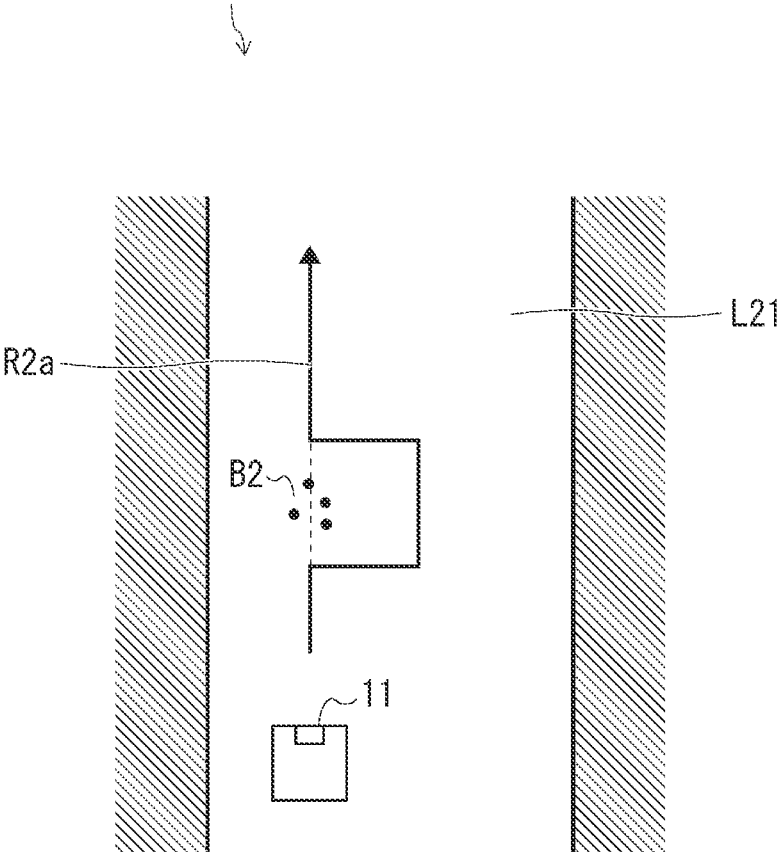
FIG. 6 is a diagram showing another example of the operation performed by the vehicle provided in the vehicle control system shown in FIG. 1 to avoid an obstacle.

FIG. 6 is a diagram showing the other example of an operation performed by the vehicle 11 to avoid an obstacle.

In the example shown in FIG. 5, a passage L21 is provided in the facility 20. In the example shown in n FIG. 5, the control apparatus 14 is moving the vehicle 11 along a moving route R2 linearly formed along the passage L21 based on the first operation information input through the remote operation terminal 15.

Note that, as shown in FIG. 6, when an obstacle B2 such as a pebble obstructing movement of the vehicle 11 has been found on the moving route R2, a supporter present near the vehicle 11 inputs operation information for instructing the vehicle 11 to avoid the obstacle B2 to the proximity operation terminal 16. By doing the above, the control apparatus 14 moves the vehicle 11 along a detour route R2a for avoiding the obstacle B2 in accordance with the operation information.

As described above, in the vehicle control system 1 according to this embodiment, since a supporter present near the vehicle 11 can assist the control of the movement of the vehicle 11 so that the vehicle 11 can avoid an obstacle which it is difficult for a user who remotely controls the vehicle 11 to visually recognize, the user can smoothly control the vehicle 11 without having to be concerned about the obstacle which it is difficult for the user to visually recognize. As a result, for example, while looking at a video image captured by the image capturing apparatus 12 mounted on the vehicle 11, the user is enabled to have an experience which simulates actually riding in the vehicle 11 without having to be concerned about whether or not there is an obstacle which it is difficult to visually recognize present. Further, since it is not necessary to provide a function for avoiding an obstacle in the vehicle 11, an increase in cost is prevented or reduced.

Note that the present disclosure is not limited to the above-described embodiment and may be changed as appropriate without departing from the spirit of the present disclosure.

Further, in the present disclosure, it is possible to implement all or part of processing performed by the vehicle control system 1 or the control apparatus 14 included therein by causing a Central Processing Unit (CPU) to execute a computer program.

The above-described program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle control system comprising:
    a vehicle configured to be movable along a predetermined route, the vehicle comprising at least an image capturing apparatus;
    a monitor configured to display a video image captured by the image capturing apparatus, the monitor being installed in a remote place that is remote from the vehicle, the remote place including an event hall where a tour of a facility is held, the facility comprising an automobile manufacturing plant;
    a first operation terminal installed in the remote place;
    a central processing unit configured to control movement of the vehicle based on first operation information input through the first operation terminal; and
    a second operation terminal installed in a place that is closer to the vehicle than to the remote place such that a first distance from the second operation terminal to the remote place exceeds that of a second distance from the second operation terminal to the vehicle,
    wherein the central processing unit is configured to cause the vehicle to wait until the second operation terminal is connected to a network,
    wherein the central processing unit is configured to check, responsive to determining that the second operation terminal being connected to the network, that the first operational terminal is connected to the network,
    wherein the central processing unit is configured to assist, based on second operation information input through the second operation terminal, the control of the movement of the vehicle that is based on the first operation information, wherein the central processing unit changes a capturing range of the image capturing apparatus to capture the predetermined area, and checks whether a priority button of the second operation terminal has been pressed in which priority is given to operation of the second operation terminal, wherein the central processing unit checks whether a remote operation button in the second terminal is pressed after determining that the priority button is not pressed and enabling operation of the first operation terminal, wherein the central processing unit controls, in response to determining that the remote operation button is pressed, traveling of a detour of the vehicle in accordance with a predetermined detour route to avoid an obstacle in accordance with the second operation information input via the second operation terminal, wherein the obstacle obstructs the movement of the vehicle and the obstacle is found in a blind spot on a moving route for which the vehicle moves along, the moving route being linearly formed along a passage provided in the facility, wherein a supporter that is present at the vehicle assists in the control of the movement of the vehicle so that it avoids the obstacle, the supporter including an administrator of the vehicle control system, wherein a user experiences a simulation of actual riding in the vehicle that avoids the obstacle by looking at the video image captured by the image capturing apparatus, and wherein the first operation terminal is operated by the user, and the second operation terminal is operated by the supporter.

2. The vehicle control system according to claim 1, wherein the central processing unit stops the movement of the vehicle regardless of a content of the first operation information based on an instruction by the second operation information to stop the movement of the vehicle.

3. The vehicle control system according to claim 2, further comprising a speaker configured to send a notification that the control apparatus has stopped the movement of the vehicle based on the central processing unit having stopped the movement of the vehicle based on the second operation information.

4. The vehicle control system according to claim 1, wherein the central processing unit causes the image capturing apparatus mounted on the vehicle to capture the predetermined area based on an instruction by the second operation information to capture a predetermined area.

5. The vehicle control system according to claim 4, further comprising a speaker configured to send a notification that the central processing unit has caused the image capturing apparatus mounted on the vehicle to capture the predetermined area based on the central processing unit having caused the image capturing apparatus mounted on the vehicle to capture the predetermined area based on the second operation information.

6. The vehicle control system according to claim 1, wherein the central processing unit controls whether or not to move the vehicle straight forward based on the first operation information and whether or not to turn the vehicle based on the second operation information.

7. A vehicle control method comprising:

controlling, based on first operation information input through a first operation terminal, movement of a vehicle configured to be movable along a predetermined route, the first operation terminal being installed in a remote place that is remote from the vehicle, the remote place including an event hall where a tour of a facility is held, the facility comprising an automobile manufacturing plant;

causing the vehicle to wait until the second operation terminal is connected to a network;

checking, responsive to determining that the second operation terminal being connected to the network, that the first operational terminal is connected to the network;

assisting, based on second operation information input through a second operation terminal, the control of the movement of the vehicle that is based on the first operation information, the second operation terminal being installed in a place that is closer to the vehicle than to the remote place such that a first distance from the second operation terminal to the remote place exceeds that of a second distance from the second operation terminal to the vehicle;

displaying, on a monitor installed in the remote place, a video image captured by an image capturing apparatus mounted on the vehicle while controlling the movement of the vehicle;

changing a capturing range of the image capturing apparatus to capture the predetermined area;

checking whether a priority button of the second operation terminal has been pressed in which priority is given to operation of the second operation terminal;

checking whether a remote operation button in the second terminal is pressed after determining that the priority button is not pressed and enabling operation of the first operation terminal; and controlling, in response to determining that the remote operation button is pressed, traveling of a detour of the vehicle in accordance with a predetermined detour route to avoid an obstacle in accordance with the second operation information input via the second operation terminal, wherein the obstacle obstructs the movement of the vehicle and the obstacle is found in a blind spot on a moving route for which the vehicle moves along, the moving route being linearly formed along a passage provided in the facility, wherein a supporter that is present at the vehicle assists in the control of the movement of the vehicle so that it avoids the obstacle, the supporter including an administrator of the vehicle control system, wherein a user experiences a simulation of riding in the vehicle that avoids the obstacle by looking at the video image captured by the image capturing apparatus, and wherein the first operation terminal is operated by the user, and the second operation terminal is operated by the supporter.

8. A non-transitory computer readable medium storing a vehicle control program for causing a computer to execute:

processing of controlling, based on first operation information input through a first operation terminal, movement of a vehicle configured to be movable along a predetermined route, the first operation terminal being installed in a remote place that is remote from the vehicle, the remote place including an event hall where a tour of a facility is held, the facility comprising an automobile manufacturing plant;

processing of causing the vehicle to wait until the second operation terminal is connected to a network;

processing of checking, responsive to determining that the second operation terminal being connected to the network, that the first operational terminal is connected to the network;

processing of assisting, based on second operation information input through a second operation terminal, the control of the movement of the vehicle that is based on the first operation information, the second operation terminal being installed in a place that is closer to the vehicle than to the remote place such that a first distance from the second operation terminal to the remote place exceeds that of a second distance from the second operation terminal to the vehicle;

processing of displaying, on a monitor installed in the remote place, a video image captured by an image capturing apparatus mounted on the vehicle while controlling the movement of the vehicle;

processing of changing a capturing range of the image capturing apparatus to capture the predetermined area;

processing of checking whether a priority button of the second operation terminal has been pressed in which priority is given to operation of the second operation terminal;

processing of checking whether a remote operation button in the second terminal is pressed after determining that the priority button is not pressed and enabling operation of the first operation terminal; and processing of controlling, in response to determining that the remote operation button is pressed, traveling of a detour of the vehicle in accordance with a predetermined detour route to avoid an obstacle in accordance with the second operation information input via the second operation terminal, wherein the obstacle obstructs the movement of the vehicle and the obstacle is found in a blind spot on a moving route for which the vehicle moves along, the moving route being linearly formed along a passage provided in the facility, wherein a supporter that is present at the vehicle assists in the control of the movement of the vehicle so that it avoids the obstacle, the supporter including an administrator of the vehicle control system, wherein a user experiences a simulation of riding in the vehicle that avoids the obstacle by looking at the video image captured by the image capturing apparatus, wherein the first operation terminal is operated by the user, and the second operation terminal is operated by the supporter.

9. The vehicle control system according to claim 1, wherein the second operation information is received from an administrator of the vehicle control system.

* * * * *